Dec. 11, 1945.    W. M. PERRY    2,390,662
ONE-PIECE SELF-LOCKING NUT

Filed June 28, 1944

INVENTOR.
WALTER M. PERRY
BY
Joseph H. Lipschutz
ATTORNEY

Patented Dec. 11, 1945

2,390,662

UNITED STATES PATENT OFFICE 2,390,662

ONE-PIECE SELF-LOCKING NUT

Walter M. Perry, Glenbrook, Conn.

Application June 28, 1944, Serial No. 542,521

9 Claims. (Cl. 10—86)

This invention relates to a self-locking nut of the type which consists of a single piece of material, as distinct from those nuts which comprise several pieces usually in the form of a fibre insert designed to perform the gripping operation. It is the principal object of this invention to provide a self-locking nut which by reason of the fact that it is of one-piece construction is relatively inexpensive.

It is a further object of this invention to provide a self-locking nut which is simple to manufacture because it is based upon a novel principle of effecting the locking function.

The large number of self-locking nuts which have been proposed is the best evidence of the fact that this problem, which on its surface is deceptively simple, is, nevertheless, a very difficult practical problem to solve. The various solutions which have been proposed have one or more inherent defects or disadvantages therein, such as difficulty of manufacture, multiplicity of parts, relatively high cost and principally the fact that these nuts can not be used repeatedly after one locking use has been made of them. It is, therefore, one of the principal objects of this invention to provide a self-locking nut which is not only inexpensive and easy to manufacture, but which may be used repeatedly in a plurality of locking operations without impairing its usefulness.

Further objects and advantages of this invention will become apparent in the following detailed description thereof.

In the accompanying drawing.

Figure 1:
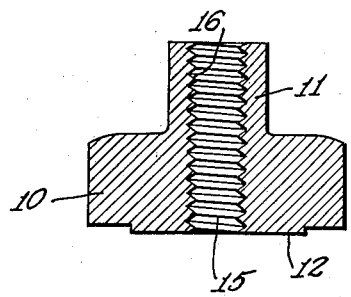
Fig. 1 is a vertical section through a form of nut before the final step in my method of forming a lock-nut is applied thereto.
Figure 2:
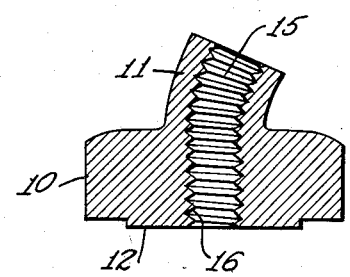
Fig. 2 is a vertical section through the form of nut shown in Fig. 1 after the final step in my method has been applied thereto.

Referring first to Figs. 1 and 2, I have shown my invention as applied to a form of lock nut made from solid stock. In this form, the lock nut is provided with a lower portion 10 which may have a polygonal exterior, as, for instance, the conventional hexagon adapted to be engaged by a wrench or other operating tool. The nut further comprises an upper portion 11 forming an extension of the lower portion. The lower portion 10 also has a base 12 adapted to engage the work piece. The nut is provided with a passageway 15 extending through the lower and upper portions, and adapted to receive the bolt upon which the nut is threaded. The axis of the passageway through the lower portion 10 and upper portion 11 is initially perpendicular to the base, as shown in Fig. 1, but in order to effect locking, I bend the upper portion so that said portion and the axis of the passageway therethrough are inclined with respect to the perpendicular. As shown in Fig. 2, the inclination of the axis of the passageway through the upper portion 11 is greatly exaggerated for the purposes of illustration, but in practice this inclination is not more than is necessary to provide the desired degree of locking. In operation it will be seen that the portion of the passageway through the lower portion 10 having its axis perpendicular to the base, will permit the bolt to enter easily and quickly. It is only when the bolt reaches the upper portion and the axis of the passageway becomes inclined that the locking action is effected. This action is positive and efficient.

By the above novel principle of effecting self-locking of a nut upon its bolt, it will be seen that a simple, inexpensive but very effective self-locking nut is obtained. The interior threading 16 of the passageway is such that the threads are in phase axially throughout the entire length of the passageway before the bending operation is performed. Thus, locking is effected with a minimum of distortion of the parts, and it is this feature which enables the nut to engage and disengage its bolt many times without distortion of the nut and without losing its effectiveness as a lock.

The method of forming the lock nut described in Figs. 1 and 2 is quickly and easily performed. The nut is formed in the usual manner from a piece of metal having a bottom portion 10 and extension 11. The passageway 15 is drilled straight through and threaded in the regular manner. It is then only necessary to grip the bottom portion and engage the upper portion with a suitable tool. The upper portion is then bent in one plane through the angular distance which will provide the desired degree of locking, and the lock nut is completed. After suitable heat treating, the upper portion will retain its inclined axis even after repeated threading and unthreading upon a bolt.

The essentials of my invention described above may be applied in various ways to different types of nuts. Several of these will now be described. Thus in Fig. 3 there is shown a nut where, between the lower portion 10 and the upper portion 11, there is provided a yielding connecting portion 20 which, in this instance, may take the form of an undercut portion which will form a neck. Thus, when the step of bending the upper portion relative to the lower portion is performed, it will be found that this step is facilitated by the yielding connecting portion 20 which will yield at the point where it is desired that the inclination of the axis shall commence. In this form, the upper portion 11 and the axis of the passageway therethrough will assume a constant inclination with respect to the perpendicular, whereas in the Fig. 2 form the inclination is at a constantly increasing angle.

Figure 3:
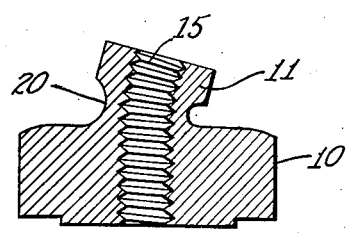
Fig. 3 is a view similar to Fig. 2 showing another form of nut embodying my invention.
Figure 4:
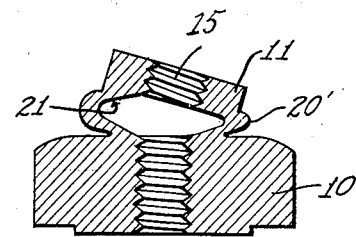
Fig. 4 is a view similar to Figs. 2 and 3 of still another form of my invention.

In Fig. 4 there is disclosed a form similar to Fig. 3, but showing a somewhat different yielding or connecting portion 20' between the lower portion 10 and the upper portion 11. In this form, the intermediate portion 20' is hollowed out as shown at 21 so that there is a break in the threading of the passageway 15. The passageway, therefore, has threads in its lower portion 10 and in its upper portion 11. In forming this nut, the bottom portion and upper portion are formed in the usual manner. The passageway 15 is bored through the upper, intermediate and lower portions and the intermediate portion 20' is then formed by cutting away portion 21. The passageway is threaded so that the threading in the upper portion is in phase with the threading through the lower portion. The upper portion is then given the necessary inclination which is facilitated by the yielding intermediate portion 20'.

Figure 5:
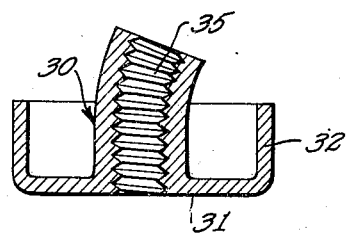
Fig. 5 is a vertical section through a form of lock nut adapted to be made from sheet metal and embodying my invention.

While I have illustrated my invention as applied to bolts formed of solid stock in the Figs. 2, 3 and 4 forms, I may apply the same principle to nuts formed out of sheet metal. Thus, for instance, in Fig. 5 there is shown a piece of sheet metal which originally was a single piece of relatively thin, flat strip, from which there is extruded a hub portion 30 having a passageway 35 therethrough. The strip of metal forms a base 31, the outer edges 32 of which may be bent upwardly in the same direction as the extruded hub 30 and formed with a polygonal exterior adapted to be gripped by the operating tool. The axis of the hub and its passageway is perpendicular to the base 31. The next step is to bend the upper portion of the hub and passageway until it assumes the proper inclination to the perpendicular sufficient to achieve the desired degree of locking. This may be done by any suitable tool and is easily accomplished by reason of the fact that the material is sheet metal and readily workable.

Figure 6:
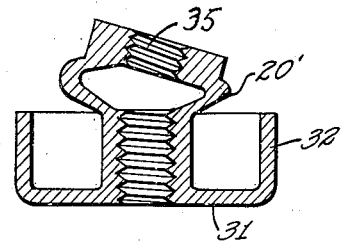
Fig. 6 is a view similar to Fig. 5 of another form of lock nut also adapted to be made from sheet metal and embodying my invention.

Similarly, the other forms shown in Figs. 3 and 4 may be stamped and formed out of sheet metal. Thus, for example, the form shown in Fig. 4 may be formed as shown in Fig. 6. The method of forming is the same as in Fig. 5 except that the extruded hub is first provided with the yielding portion 20' and thereafter the upper portion is bent to the necessary degree of inclination with respect to the lower portion.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A self-locking nut having a bolt-receiving passageway extending therethrough, the wall of the passageway forming a surface of revolution throughout its length, the axis of revolution of said passageway being perpendicular to the base of the nut for a predetermined distance above the base and thereafter being inclined to said perpendicular.

2. A self-locking nut having a bolt-receiving passageway extending therethrough, the wall of the passageway forming a surface of revolution throughout its length, the axis of revolution of said passageway being perpendicular to the base of the nut for a predetermined distance above the base and thereafter being inclined at a progressively increasing angle to the perpendicular.

3. A self-locking nut having a lower portion and an upper portion, said portions having a bolt-receiving passageway extending therethrough, the wall of the passageway forming a surface of revolution throughout its length, the axis of revolution of the passageway in said lower portion being perpendicular to the base of the nut, and the upper portion and the axis of revolution of the passageway therein being inclined to said perpendicular.

4. A self-locking nut having a lower portion and an upper portion, the lower portion being formed with a polygonal exterior adapted to be engaged by an operating tool, said nut having a bolt-receiving passageway extending therethrough, the wall of the passageway forming a surface of revolution throughout its length, the axis of revolution of said passageway in the lower portion being perpendicular to the base, said upper portion and the axis of revolution of the passageway therein being inclined to the perpendicular.

5. A self-locking nut having a lower portion, an upper portion, a yielding portion between said lower and upper portions, said portions having a bolt-receiving passageway extending therethrough, the wall of the passageway forming a surface of revolution throughout its length, the axis of revolution of the passageway in said lower portion being perpendicular to the base of the nut, and the axis of revolution of said passageway in said upper portion being inclined to said perpendicular.

6. A self-locking nut having a lower portion, an upper portion, a yielding portion between said lower and upper portions, said portions having a bolt-receiving passageway extending therethrough, the wall of the passageway forming a surface of revolution throughout its length, the passageway through said lower and upper portions being threaded, the axis of revolution of the passageway in said lower portion being perpendicular to the base of the nut, and the axis of revolution of said passageway in said upper portion being inclined to said perpendicular, the threaded portions being in phase except for the inclination.

7. The method of forming a self-locking nut from sheet metal, which consists in extruding a hub from the sheet as a base, forming a bolt-receiving passageway in said hub so that the wall of the passageway forms a surface of revolution throughout its length, the axis of revolution of the passageway being perpendicular to the base, and then bending the upper portion of said hub so that the axis of revolution of the passageway in the upper portion is inclined at an angle to the perpendicular.

8. The method of forming a self-locking nut from sheet metal, which consists in extruding a hub from the sheet as a base, forming said hub into a lower portion, an upper portion and an intermediate yielding portion between said lower and upper portions, forming a bolt-receiving passageway through said portions so that the wall of the passageway forms a surface of revolution throughout its length, the axis of revolution of the passageway being perpendicular to the base, and bending the upper portion so that the axis of revolution of the passageway therein is at an angle to the perpendicular.

9. The method of forming a self-locking nut from sheet metal, which consists in extruding a hub from the sheet as a base, forming said hub into a lower portion, an upper portion and an intermediate yielding portion between said lower and upper portions, forming a bolt-receiving passageway through said portions so that the wall of the passageway forms a surface of revolution throughout its length, the passageway in said lower and upper portions being threaded, the threads of said portions being in phase, the axis of revolution of the passageway through said portions being perpendicular to the base, and bending the upper portion so that the axis of revolution of the passageway therethrough is at an angle to the perpendicular.

WALTER M. PERRY.